Dec. 14, 1926.

C. H. COLVIN

COMPASS

Filed Dec. 12, 1919

1,610,931

INVENTOR.
Charles H. Colvin.
by
James C. Ledbetter
atty

Patented Dec. 14, 1926.

1,610,931

UNITED STATES PATENT OFFICE.

CHARLES H. COLVIN, OF BROOKLYN, NEW YORK.

COMPASS.

Application filed December 12, 1919. Serial No. 344,398.

This invention relates to compasses, and more particularly to a magnetic compass involving a new principle of construction, for use on airships, marine vessels and in fact any type of vehicle on which a compass is used.

An object of this invention is to produce a magnetic compass which is comparatively stable and dependable in its directive functions, and which has means combined therewith to stabilize the indicating element, in order that the compass may find increased use, and better serve navigating conditions on airships and aboard vessels.

While a magnetic compass is a very simple instrument for indicating direction, and is generally used as a navigating instrument, it is unreliable and inaccurate at times, due to the adverse conditions under which it operates. For example, a magnetic compass on an airplane is subjected to the continuous vibrations and accelerating forces of the plane; and the compass element is quite commonly thrown off its true direction, or even rotates complete turns because of disturbing forces which are very prevalent in ships of the air. It is fitting, therefore, that the primary object of this invention is to increase the reliability and accuracy of the magnetic compass without departing from its inherent simplicity.

To these ends a compass constructed in accordance with the pronounced principles of this invention employs a gyroscope associated with an ordinary magnetic compass for rendering the compass more reliable and accurate in its meridian seeking function.

The accompanying drawing forms a part of this disclosure and presents one practical embodiment of this invention.

Figure 1:
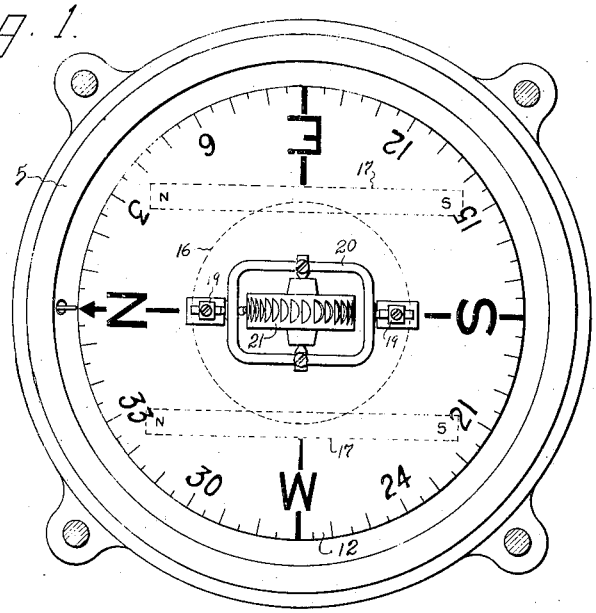
Figure 2:
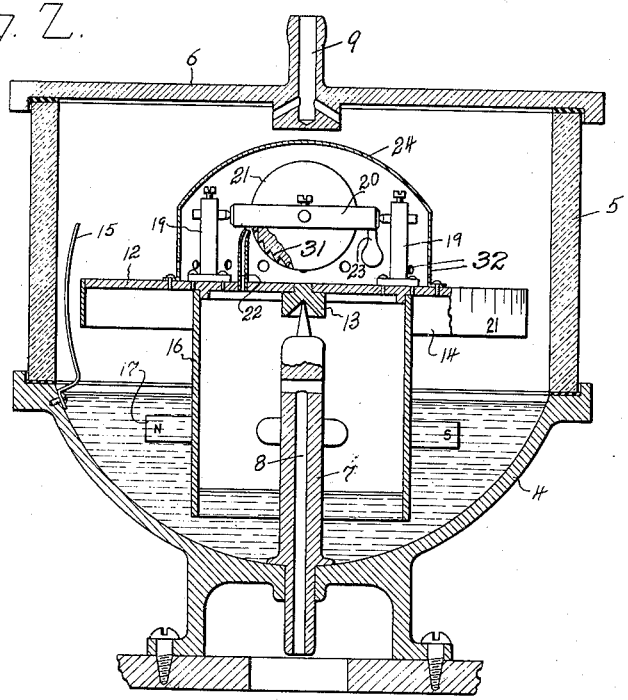

Figure 1 shows a plan view of the compass with certain cover parts removed, and Figure 2 illustrates a vertical sectional view of the compass with some parts thereof broken away to illustrate the important features of the invention.

Referring now more particularly to the drawings for a detailed discussion of the invention, there is shown a compass housing comprising a suitably shaped bowl 4, preferably of metal, carrying a transparent cylinder 5. The housing is closed by a cover plate 6, and there is formed a liquid and air-tight joint between the contacting edges of the several housing parts in order that the compass housing may be liquid tight. The compass bowl 4 is provided with a central post 7 carrying a pivot point on top thereof. The post is hollow or has a bore 8 formed therethru, and projecting through the compass bowl to receive one end of a flexible rubber hose connection which may be employed for transmitting air under pressure into the compass housing. The cover cap likewise has a nipple connection 9 for attachment with a rubber hose connection in case air is exhausted from the compass housing, as later described. The compass housing is partly filled with suitable liquid.

A compass element or card 12 is provided with a central pivot cup 13 and is mounted on the pivot point of the post 7 and free to rotate thereupon. The compass card 12 is provided with a flange 14 made on the periphery thereof. The flange 14 is in fact the compass card vertically disposed and may be marked N., S., E., W., to designate the four major indications of direction, namely: north, south, east and west, or in any approved manner. Likewise the card 12 may be marked with degree and direction indications. A lubber's line 15 is fixed to the compass housing and arranged adjacent the indicator element of the compass as a reference mark for reading the directional indication of the compass.

An air cylinder 16 is concentrically fixed to the underneath side of the compass element and forms an airtight joint where it is attached to the card 12. The lower portion of the air cylinder 16 is left open, and dips into the liquid in the bowl. The air cylinder 16 carries the compass magnets 17, which are constructed in accordance with known principles in the art, and are secured to the periphery of the air cylinder 16 by and approved method. Usually it is practical to employ a pair of compass magnets 17, each of which is carried below the compass element in a parallel relation, and suitably balanced, in order that said element may properly rotate on its pivot point. The liquid in the air cylinder 16 stands normally level with the liquid in the bowl.

A description will now be given of the gyroscopic element carried on the compass card for effecting the purposes of the invention, as previously outlined. Posts 19 are fixed on the compass card and pivotally carry a frame 20. Any suitable form of pivot points may be employed, such as hardened pins or jeweled bearings between the posts 19 and frame 20. A rotor 21 is journaled in the frame 20 and is mounted on suitable bearings best adapted for this purpose. The rotor 21 has notches or air pockets 31 formed in the periphery thereof, as shown in the drawings. An air nozzle 22 is fixed in the compass card, and opens into the air cylinder 16. The upper end of the air nozzle is arranged close to the notched periphery of the rotor and delivers a stream of air issuing from the orifice at high velocity impinging the rotor to spin same. A centralizing weight or pendulum 23 is fixed to the frame 20 and hangs therefrom to act as a centralizer for the gyroscopic element. A suitable cover 24 is secured to the compass over the gyroscopic element to inclose the working parts. A plurality of air discharge holes 32 is equally distributed around the cover 24 to release the air from the enclosed space within the cover.

The gyroscopic element is employed for the purpose of arresting the erratic yawing tendencies of the compass element, and in fact acts to impart inertia to the compass element 14 and prevent same from unduly rotating or spinning on its pivot point. It is common for the compass element to yaw or even spin on its pivot point, and the gyroscopic element restrains the compass card from this erratic action. A more detailed discussion of the principles of the combined compass and gyroscope will now be given.

Any suitable source of air pressure, or means for exhausting the air from the compass housing may be employed for spinning the rotor 21. To this end a tubular connection is made with the bottom end of the post 7, so that air under suitable pressure may be communicated to the air cylinder 16, which slightly depresses the liquid as shown in the drawings. The air flows through the nozzle 22 and issues at high velocity against the notched periphery of the rotor 21. This causes the rotor to spin at relatively high velocity, thereby setting up the desired gyroscopic force employed to stabilize and steady the compass element 14. The air passes from the gyroscopic element through the plurality holes formed in the lower portion of the cover 24, and escapes from the compass housing through the hole 9. By discharging the air from the cover 24 through the plurality of equally distributed holes around the cover, there arises no disturbance or reaction tending to rotate the magnetic element.

It is apparent to those versed in the art that the spinning wheel 21 mounted on the compass element in the manner shown in the drawings, will greatly augment the inertia of the magnetic element about a normally vertical axis passing through its pivot point. The effect of this added inertia is to resist any disturbing force which may act on the compass element to cause an error in direction, and thus arrest or equalize disturbing forces acting through a period of time with the result that the compass element does not deviate perceptibly from the magnetic meridian.

A more detailed analysis of the operation will show that when any force tends to disturb the proper direction of the compass, the gyroscope is caused to precess, that is to say, it swings about the axis on the posts 19, and thus lifts the centralizing weight 23. It is known, of course, that the direction of the swing, or precession, is dependent upon the direction of the disturbing force impressed against the compass. The force which causes the gyroscope to precess also causes the compass card 14 to move off its correct position in respect to the lubber's line. But as the inertia of the magnetic element, due to the presence of the gyroscopic effort, is very great, the movement of the card and the precession of the gyroscope is extremely slow; and it is this extremely slow movement of the compass card which makes the compass function in accordance with the plan and intent of this invention. When the aforementioned disturbing force ceases, the pendulum 23 acts to centralize the gyroscope, that is to say, the pendulum returns the gyroscopic element to its original vertical position; and in returning to its centralized position the gyroscope in fact acts on the compass card 14 to move it still further off from its correct position, or to move the card in the same direction as the original upsetting force. It is understood, however, by those conversant in the art, that the sum of all upsetting forces acting through a period of time neutralize each other, and therefore the sum of all the errors caused by the different forces acting on the card will in a short period of time equal zero, and as the compass card is affected very slowly by any one disturbing force, the maximum error at any one time is negligible.

This arrangement and accomplishment provides a magnetic compass of marked reliability and accuracy. The invention is presented to fulfill the needs felt for a reliable magnetic compass, and may be used to advantage on aircraft. Often the pilot may be flying above or in clouds, and it is then he greatly needs a reliable, steady compass free from erratic spinning tendencies. The present invention is presented to accomplish such ends.

Having thus described the construction and operation of the invention, what I desire to claim and secure by Letters Patent is:

1. In a compass, a magnetic element for indicating direction, a gyroscope carried by the magnetic element and means for driving the gyroscope.

2. A magnetic compass comprising in combination a magnetic element for indicating direction, and a gyroscopic element mounted on said magnetic element.

3. A compass having a magnetic element, a frame pivotally mounted on the magnetic element, and a spinning wheel journaled in the frame for arresting disturbing rotative tendencies common to a magnetic element.

4. A magnetic compass comprising in combination, a magnetic element, a gyroscope mounted thereon, and pneumatic means for driving said gyroscope.

5. In a compass, a housing, a magnetic element pivoted therein, and a gyroscopic element carried on the magnetic element.

6. A compass having a magnetic element, a frame pivotally mounted on the magnetic element, a spinning wheel journaled in the frame, and a pendulum depending from the frame to normally hold the spinning wheel in a vertical plane.

7. A compass having a magnetic element for indicating direction, a gyroscope carried upon the magnetic element, means for spinning the gyroscope, and means for restoring the gyroscope to normal position.

8. A magnetic compass comprising in combination a magnetic element, a gyroscope mounted thereon, and means for holding the plane of rotation of the gyroscope normally vertical.

9. A combination magnetic and gyroscopic compass, a magnetic compass card to indicate direction, a housing enclosing the compass parts, a hollow post carried by the housing which supports the magnetic element thereby permitting the housing to rotate relatively to the compass card, means constituting an air seal surrounding the hollow post which affords a supply of compressed air, a gyroscope mounted on the card to stabilize the compass, and means conveying compressed air to drive the gyroscope.

10. A compass comprising in combination, a casing, a compass card magnetic element pivotally carried therein to indicate direction, a gyroscopic stabilizer carried on the compass card, a cover disposed over the stabilizer, pneumatic means driving the gyroscope, liquid means cooperating with the pneumatic driving means, and an air chamber sealed onto the compass card and dipping into the liquid forming an air seal cooperating with the pneumatic means.

11. A compass comprising in combination, a graduated compass card, a bowl enclosing the compass card, a cylinder secured concentrically underneath the card and adapted to dip into a liquid in the bowl, a support post secured in the bowl projecting upwardly through the liquid and on which the card is pivotally supported, magnets adapted to impart directive force to the card, and means adapted to arrest the excess rotative tendency of the card.

12. A compass comprising in combination, a graduated compass card, a bowl enclosing the compass card, a cylinder secured concentrically underneath the card and adapted to dip into a liquid in the bowl, a support post secured in the bowl projecting upwardly through the liquid and on which the card is pivotally supported, magnets adapted to impart directive force to the card, and a gyroscope mounted on the card above the cylinder to stabilize the card.

13. A compass comprising in combination, a graduated compass card, a bowl enclosing the compass card, a cylinder secured concentrically underneath the card and adapted to dip into a liquid in the bowl, a support post secured in the bowl projecting upwardly through the liquid and on which the card is pivotally supported and said post being provided with an air passage leading therethrough and opening into the cylinder above the liquid level, means operable by air feeding through the air passage to stabilize the card, and magnets arranged to impart directive force to the card.

CHARLES H. COLVIN.